(12) United States Patent
Ellerbrok et al.

(10) Patent No.: US 6,634,670 B1
(45) Date of Patent: Oct. 21, 2003

(54) AIRBAG FOR AN OCCUPANT RESTRAINT SYSTEM

(75) Inventors: Norbert Ellerbrok, Rudersberg (DE); Alexander Heilig, Wissgoldingen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/623,145

(22) PCT Filed: Dec. 18, 1998

(86) PCT No.: PCT/EP98/08350

§ 371 (c)(1),
(2), (4) Date: Aug. 28, 2000

(87) PCT Pub. No.: WO99/46150

PCT Pub. Date: Sep. 16, 1999

(30) Foreign Application Priority Data

Mar. 10, 1998 (DE) .................................... 298 04 239 U

(51) Int. Cl.$^7$ ................................................ B60R 21/16
(52) U.S. Cl. .................... 280/743.1; 280/729; 280/733
(58) Field of Search ............................ 280/728.1, 729, 280/730.1, 743.1, 743.2, 733

(56) References Cited

U.S. PATENT DOCUMENTS

| | | | |
|---|---|---|---|
| 5,333,903 A | | 8/1994 | Eyrainer et al. |
| 5,375,878 A | * | 12/1994 | Ellerbrok ............. 280/743.1 X |
| 5,421,610 A | * | 6/1995 | Kavanaugh et al. . 280/743.1 X |
| 5,573,270 A | * | 11/1996 | Sogi et al. ........... 280/743.1 X |
| 5,584,508 A | | 12/1996 | Maruyama et al. |
| 5,692,777 A | * | 12/1997 | Tochacek et al. .... 280/743.1 X |
| 5,899,495 A | * | 5/1999 | Yamamoto et al. .. 280/743.1 X |
| 6,129,377 A | * | 10/2000 | Okumura et al. .... 280/743.1 X |
| 6,139,048 A | * | 10/2000 | Braunschadel ........... 280/743.1 |
| 6,145,879 A | * | 11/2000 | Lowe et al. ............. 280/743.1 |
| 6,183,003 B1 | * | 2/2001 | Matsuhashi et al. . 280/743.1 X |
| 6,183,009 B1 | * | 2/2001 | Rychter et al. .......... 280/743.1 |

FOREIGN PATENT DOCUMENTS

| | | |
|---|---|---|
| DE | 2030863 | 12/1971 |
| DE | 19643052 | 9/1997 |
| DE | 29713111 | 3/1998 |
| EP | 0495409 | 7/1992 |
| EP | 0553542 | 8/1993 |
| EP | 0803407 | 10/1997 |
| GB | 2257950 | 1/1993 |
| GB | 2257952 | 1/1993 |
| GB | 2314298 | 12/1997 |
| WO | 9009295 | 8/1990 |

* cited by examiner

Primary Examiner—Paul N. Dickson
Assistant Examiner—Toan C To
(74) Attorney, Agent, or Firm—Tarolli, Sundheim, Covell & Tummino L.L.P.

(57) ABSTRACT

In a vehicle occupant restraint system there is provided a gas bag having a wall (12) which has portions distributed across its surface area which, with increasing gas bag internal pressure, increase the volume of said gas bag (10) by a deployment or smoothing action. If the internal pressure in the gas bag rises due to increased power output of the gas generator or in case of high temperatures, a limitation of the increase in pressure is achieved by the increase in volume of the gas bag.

2 Claims, 3 Drawing Sheets

AIRBAG FOR AN OCCUPANT RESTRAINT SYSTEM

BACKGROUND OF THE INVENTION

The invention relates to a gas bag for a vehicle occupant restraint system comprising an inflation port and a wall. Such gas bags are inflated, when the vehicle is involved in a collision, within a few milliseconds by the gas provided by an inflator and serve to absorb the impact of the vehicle occupant.

It is often a disadvantage with conventional gas bags that they are inadequately adapted to the inflator output. The amount of gas expelled may vary greatly which in extreme situations may result in the gas bag being insufficiently filled or caused to rupture. In addition, such gas bags are typically dimensioned merely for vehicle occupants of average stature and weight. Thus, for example, as compared to the impact of a lightweight occupant, the typical gas bag does not offer additional possibilities for compensating the kinetic energy of a relatively heavy occupant to diminish the rebound of the heavy occupant from the gas bag.

From DE-A-20 30 863 there is known a gas bag comprising an inflation port and a wall, in which gas bag the wall comprises portions distributed across its surface area which, with increasing gas bag internal pressure, increase the volume of the gas bag by a deployment or smoothing action.

WO-A-9009295 discloses a gas bag in which tethers, made of stronger threads as compared with the remaining gas bag fabric, are interwoven with the gas bag wall at predetermined sites. As the fabric of the gas bag wall is pre-shrinked in contrast to the threads of the tethers, a controlled expanding of the gas bag can be achieved with the tethers.

SUMMARY OF THE INVENTION

The invention provides a gas bag which better adapts to the load concerned. By individually setting the volume and thus the hardness of the gas bag corresponding to the load, the gas bag may adapt to various crash situations as well as to various power outputs of the gas generator.

For this purpose it is made provision according to a first aspect of the invention that in a generic gas bag, as is known from the cited DE-A-20 30 863, the wall comprises folds formed by constrictions of the wall portions.

According to a second aspect of the invention the portions of the wall consist of a textile fabric comprising tear threads with loops woven therein.

According to a third embodiment the portions of the wall consist of a corrugated material.

The design of the gas bag in accordance with the invention results in the advantage that the risk of the gas bag rupturing at extremely high temperatures—and the associated greater expansion of the gas generated by the inflator for inflating the gas bag—is reduced by the possibility of compensating the overpressure by providing an additional volume. As a result of this, the gas bag volume can be diminished so that the gas bag is adequately filled even at extremely low temperatures to offer the occupant protection.

BRIEF DESCRIPTION OF THE DRAWINGS

Further features and advantages of the invention read from the following description and from the drawing to which reference is made and in which.

DESCRIPTION OF THE PREFERRED EMBODIMENTS

Figure 1A:
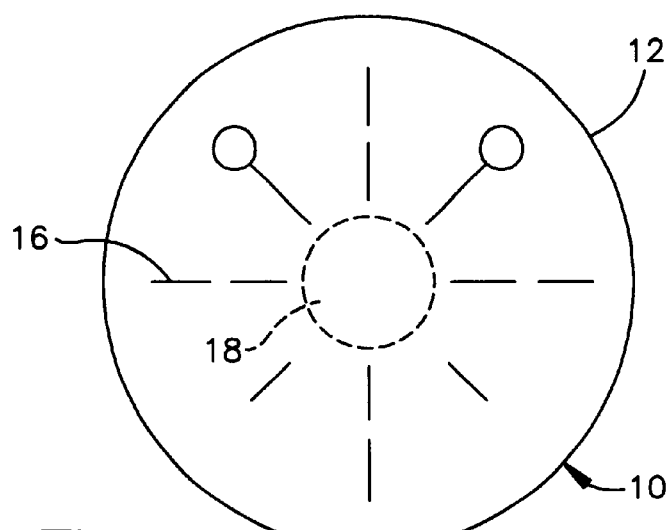
FIG. 1a illustrates a first embodiment of a gas bag.

Referring now to FIG. 1a, there is illustrated a plan view of an inflated gas bag in accordance with a first embodiment. The gas bag 10 comprises on the inner side of its part of the wall 12 facing the vehicle occupant several taken-in wall portions 14. The seams 16, each of which is oriented radially to the inflation port 18 of the gas bag 10, are configured as tear seams, designed to tear at a predetermined internal pressure of the gas bag 10. In the process, it depends on the nature of the impact as to whether or which seams 16 tear. When, for instance, a relatively lightweight occupant impacts the gas bag 10 fewer seams 16 tear than in the case of a likewise severe impact by a heavier occupant. In addition, the location of the impact also determines which of the seams 16 is caused to tear. In addition to this, the gas bag 10 can be adapted to the output of the inflator by seams 16 being caused to tear corresponding to the expansion and thus to the pressure of the gas made available, so that the volume of the gas bag 10 is increased.

Figure 1B:
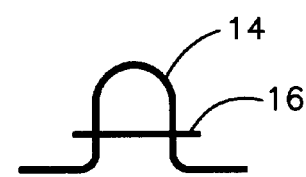
FIG. 1b is a schematic side view of a taken-in wall portion in accordance with a first variant.

Referring now to FIG. 1b there is illustrated schematically a taken-in wall portion 14 of the gas bag 10 as shown in FIG. 1a. In this embodiment, as shown in all others described below, the folds of the wall 12, formed by taking in are directed toward the interior of the gas bag so that the vehicle occupant when diving into the gas bag 10 does not come into contact with the folds; in addition to this the seams 16 may be additionally stitch-locked. The gas bag 10 has an inner wall surface I and an outer wall surface 0.

Figure 2A:
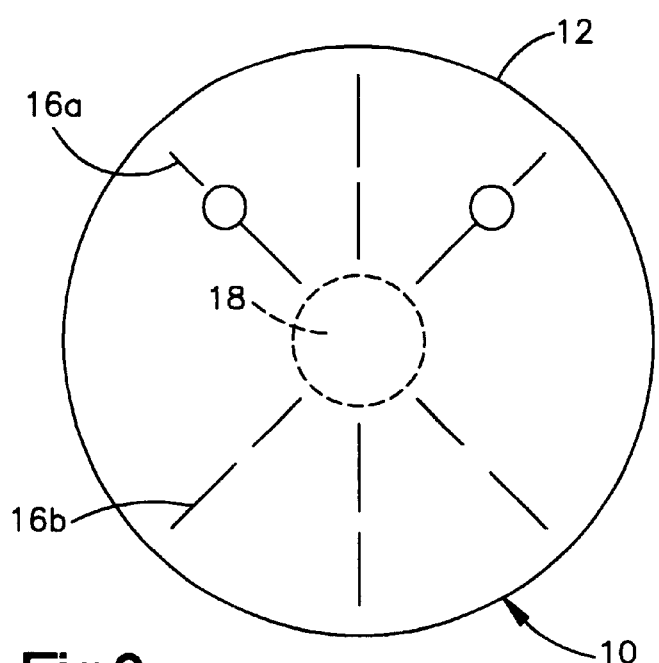
FIG. 2a illustrates a second embodiment of a gas bag.
Figure 2B:
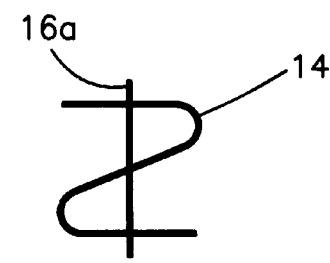
FIG. 2b is a schematic side view of a taken-in wall portion in accordance with a second variant.

Referring now to FIG. 2a there is illustrated a second embodiment which differs from the first by threads differing in thickness being used alternatingly for the tear seams 16a, 16b. The seams identified 16a are formed by thicker threads, featuring a higher tear strength than the thinner threads as used and identified 16b. As an alternative to the method as illustrated in FIG. 1b the wall portions 14 of the gas bag 10 may also be taken in as shown in FIG. 2b.

Figure 3A:
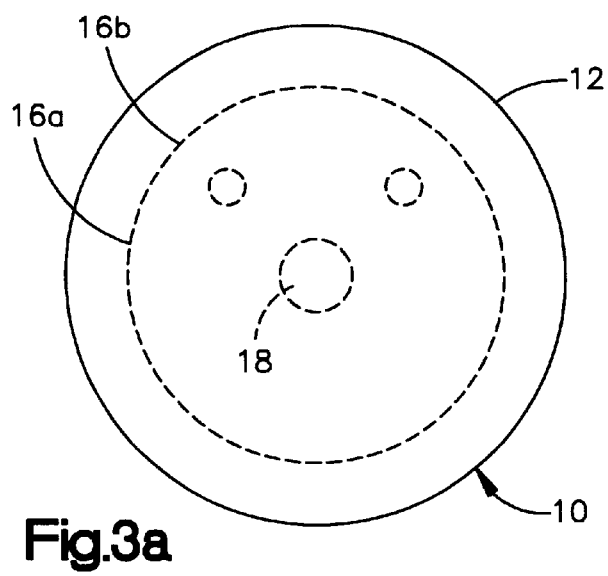
FIG. 3a illustrates a third embodiment of a gas bag.
Figure 3B:
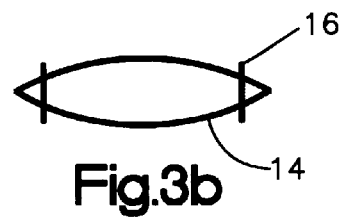
FIG. 3b is a schematic side view of a taken-in wall portion in accordance with a third variant.
Figure 3C:
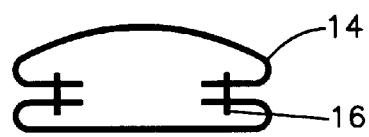
FIG. 3c illustrates a taken-in wall portion the same as in FIG. 3b but turned inside out in a first way.
Figure 3D:
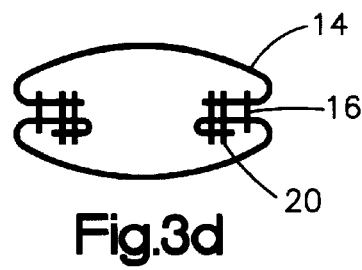
FIG. 3d illustrates a taken-in wall portion the same as in FIG. 3b but turned inside out in a second way.

Referring now to FIG. 3a the gas bag 10 comprises tear seams 16a, 16b oriented in a concentric circle around the inflation port 18. For the tear seams 16a, 16b threads the same in thickness or threads alternating thin and thick may be used. A taken-in wall portion 14 of the gas bag 10 as shown in FIG. 3a is evident from FIG. 3b. It is possible to turn the wall portion inside out prior to stitching, FIGS. 3c and 3d illustrating two such variants, the latter of which shows start and end of the seam being additionally stitch-locked by two stitches 20.

Figure 4:
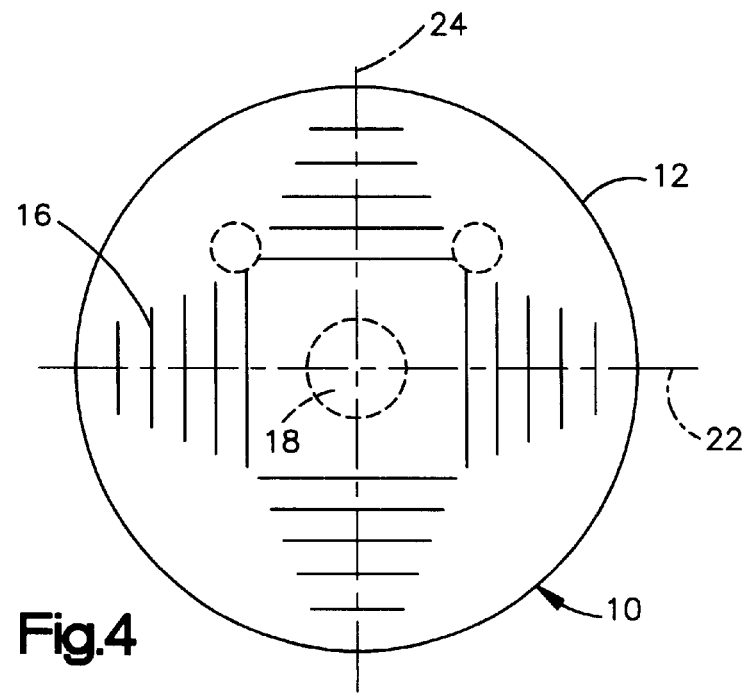
FIG. 4 illustrates a fourth embodiment of a gas bag.

A fourth embodiment of a gas bag 10 is illustrated in FIG. 4. In this case the seams 16 are distributed to four inner side portions of the part of the wall 12 facing the occupant. In the individual portions the seams 16 run in a straight line and parallel to each other, they being oriented perpendicular to the axes of symmetry 22 and 24, respectively. Each of the seams 16 of one portion runs perpendicular to that of the adjacent portion.

Figure 5A:
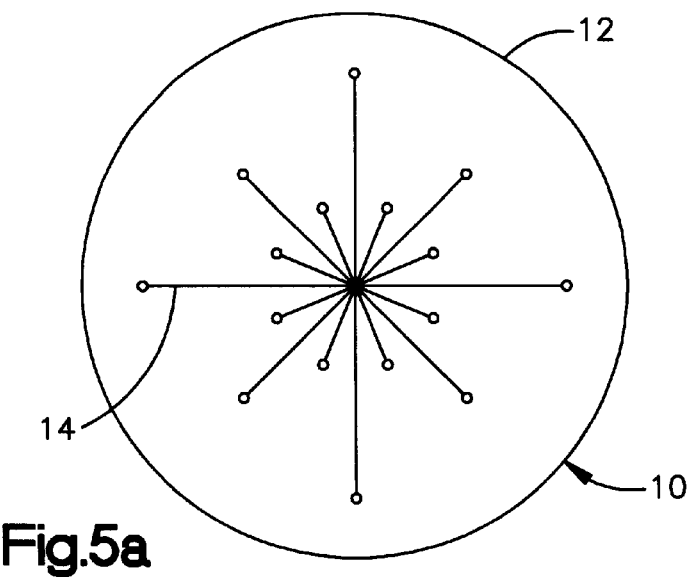
FIG. 5a illustrates a fifth embodiment of a gas bag.
Figure 5B:
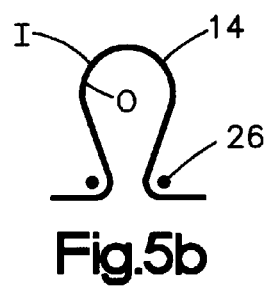
FIG. 5b is a schematic side view of a constricted wall portion.

Referring now to FIG. 5a there is illustrated a gas bag 10, the wall 12 of which comprises a plurality of folds. These folds are formed by constricting specific wall portions 14, as evident from FIG. 5b, each fold being looped around three times by a thread 26 and subsequently firmly knotted or sewn up. The thread may also be knotted and additionally sewn up. The effect of these constrictions corresponds to that of the tear seams 16 in the embodiments as already described, i.e. the thread 26 or seam tearing when correspondingly stressed, thus releasing the fold.

Figure 6A:
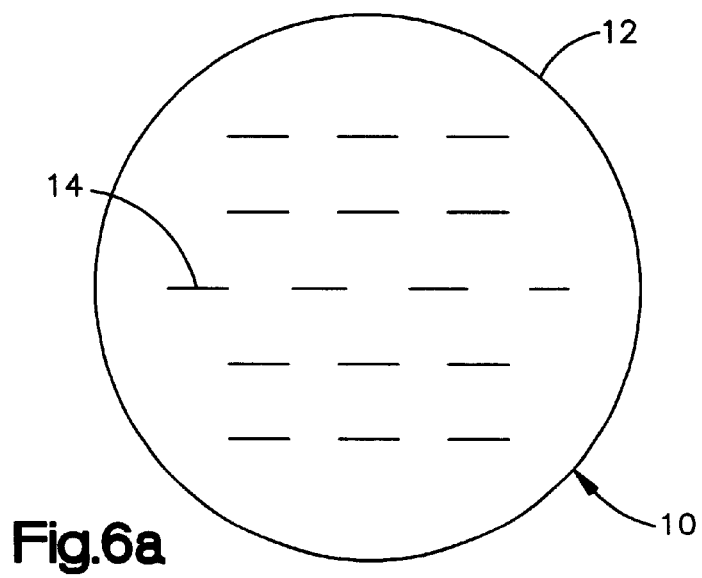
FIG. 6a illustrates a sixth embodiment of a gas bag.
Figure 6B:
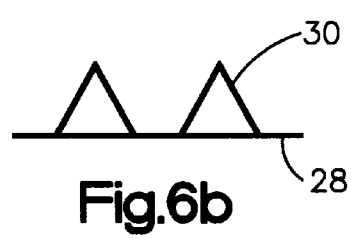
FIG. 6b is a schematic side view of a wall portion with loops woven therein.

Referring now to FIG. 6a the gas bag 10 illustrated therein comprises several wall portions 14 having a special fabric structure as evident from the cross-section in FIG. 6b. Loops 30 directing toward the interior of the gas bag are woven into the continuous tear threads 28. In this arrangement the tear threads 28 are thinner than the threads of the loops 30. When a force acting thereon is high enough to cause the tear threads 28 to tear, the tear-resistant loops 30 are released. With an appropriate overpressure in the interior of the gas bag the fabric is thus not destroyed, the volume of the gas bag 10 instead being increased by defined tearing of the wall portions 14, analogous to the embodiments as already described. The tear seams 28 may be of differing thickness.

Figure 7:
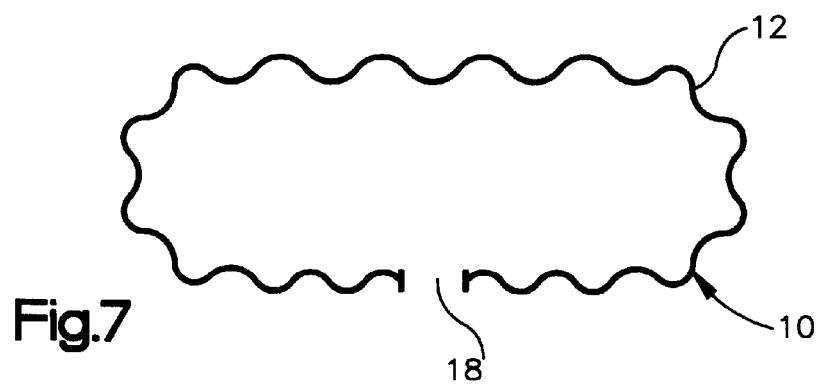
FIG. 7 illustrates a seventh embodiment of a gas bag.

Finally, in FIG. 7 there is illustrated a seventh embodiment of a gas bag 10. In this version the upper and lower side of the wall 12 is formed from a material blank which is corrugated. The filaments of the fabric are not stretched so that they can be expanded by up to approximately 100%. A gas bag 10 woven from such threads remains corrugated when the gas stream ejected from the inflator is relatively light or the impact of the vehicle occupant is relatively light, whilst its surface becomes smooth when the gas ejection is comparatively high or the impact is relatively severe, accompanied by a corresponding increase in volume of the gas bag 10.

What is claimed is:

1. An inflatable gas bag having a wall defining a gas bag inflation volume and an inflation port formed in said wall, said wall having multiple folds therein distributed over a major area of said wall, each of said folds being defined by a constriction in said wall, each of said constrictions being formed by looping a thread around a folded wall portion, said thread looped around said folded wall portions defining an enclosed volume, said enclosed volume being separated from said inflation volume of said gas bag, and at least some of said folds unfolding in response to the threads breaking upon reaching a predetermined inflation pressure within said gas bag, said unfolding of said gas bag increasing said inflation volume of said gas bag.

2. An inflatable gas bag comprising:

a gas bag wall defining an internal gas bag inflation volume, said gas bag wall having a plurality of folds therein, each of said folds being formed by portions of said gas bag wall folded into said internal inflation volume of said gas bag, each of said folds thus lying inside said inflation volume of said gas bag, each of said folds comprising portions of said gas bag facing another portion of said gas bag, each of said portions of said gas bag facing another portion of said gas bag comprising only one layer of said gas bag wall, said folds unfolding upon reaching a predetermined inflation pressure within said gas bag, said unfolding of said folds increasing said internal inflation volume of said gas bag, said gas bag wall having inner and outer surfaces, said portions of said gas bag wall facing each other being outer surface portions of said gas bag wall, and each of said folds comprising looping a thread around inner gas bag wall portions folded into said internal inflation volume of said gas bag, and said folds unfolding in response to said threads breaking.

* * * * *